United States Patent [19]
Kerwin et al.

[11] Patent Number: 6,062,023
[45] Date of Patent: May 16, 2000

[54] CANTILEVERED CRANKSHAFT STIRLING CYCLE MACHINE

[75] Inventors: John Kerwin, Weston, Mass.; Kingston Owens, Bedford, N.H.; Michael Norris, Manchester, Mass.; Dean L. Kamen, Bedford, N.H.; Tim Duggan, Epsom, N.H.; Christopher C. Langenfeld, Nashua, N.H.

[73] Assignee: New Power Concepts LLC, Manchester, N.H.

[21] Appl. No.: 09/115,383

[22] Filed: Jul. 14, 1998

Related U.S. Application Data

[60] Provisional application No. 60/052,535, Jul. 15, 1997.

[51] Int. Cl.[7] .................................................... F01B 29/10
[52] U.S. Cl. ................................ 60/520; 60/524; 60/526
[58] Field of Search .............................. 60/520, 517, 526, 60/523, 524

[56] References Cited

U.S. PATENT DOCUMENTS

| | | | |
|---|---|---|---|
| 2,595,457 | 5/1952 | Holm et al. ............................... | 257/245 |
| 4,450,754 | 5/1984 | Liljequist ................................... | 92/138 |
| 5,590,528 | 1/1997 | Viteri ........................................ | 60/684 |

FOREIGN PATENT DOCUMENTS

| | | |
|---|---|---|
| 0 457 399 A2 | 11/1991 | European Pat. Off. . |
| 84 11 960 | 7/1988 | Germany . |
| 37 23 950 A1 | 8/1988 | Germany . |
| 43 36 982 A1 | 5/1995 | Germany . |

OTHER PUBLICATIONS

Moeller, F.H., "Prime Movers for Series Hybrid Vehicles", *Electric and Hybrid Vehicles Design Studies*, Society of Automotive Engineers, Inc.

Bartolini, et al., "A New Small Stirling Engine Prototype for Auxiliary Employments Aboard", *IECEC* Paper No. SC–38, ASME 1995, pp. 317–321.

*Primary Examiner*—Hoang Nguyen
*Attorney, Agent, or Firm*—Bromberg & Sunstein LLP

[57] ABSTRACT

A Stirling machine having two pistons coupled to a harmonic crank drive linkage for providing a specified phase relationship between sinusoidal displacements of each piston with respect to a fixed fiducial point. The harmonic crank drive linkage has a primary crankshaft and an eccentric crankshaft mounted internally to the primary crankshaft and coupled via a gear set to counterrotate with respect to the primary crankshaft. The eccentric crankshaft may be cantilevered with respect to the primary shaft, with the pistons of the engine coupled to the eccentric crankshaft externally to the supporting bearings. A flywheel coupled to the eccentric crankshaft provides for operation of the engine with a zero net angular momentum. An intake manifold provides for mixing air and fuel for combustion heating of the engine.

17 Claims, 14 Drawing Sheets

"UNWRAPPED" VIEW OF HEADER DUCTS

SECTION A-A

CANTILEVERED CRANKSHAFT STIRLING CYCLE MACHINE

The present application claims priority from U.S. provisional application No. 60/052,535, filed Jul. 15, 1997, which is herein incorporated by reference.

TECHNICAL FIELD

The present invention pertains to improvements to a Stirling cycle heat engine or refrigerator and more particularly to improvements relating to mechanical and thermal components of a Stirling cycle heat engine or refrigerator which contribute to increased engine operating efficiency and lifetime, and to reduced size, complexity and cost.

BACKGROUND OF THE INVENTION

Stirling cycle machines, including engines and refrigerators, have a long technological heritage, described in detail in Walker, *Stirling Engines*, Oxford University Press (1980), incorporated herein by reference. The principle underlying the Stirling cycle engine is the mechanical realization of the Stirling thermodynamic cycle: isovolumetric heating of a gas within a cylinder, isothermal expansion of the gas (during which work is performed by driving a piston), isovolumetric cooling, and isothermal compression. The Stirling cycle refrigerator is also the mechanical realization of a thermodynamic cycle which approximates the ideal Stirling thermodynamic cycle. In an ideal Stirling thermodynamic cycle, the working fluid undergoes successive cycles of isovolumetric heating, isothermal expansion, isovolumetric cooling and isothermal compression. Practical realizations of the cycle, wherein the stages are neither isovolumetric nor isothermal, are within the scope of the present invention and may be referred to within the present description in the language of the ideal case without limitation of the scope of the invention as claimed.

Various aspects of the present invention apply to both Stirling cycle engines and Stirling cycle refrigerators, which are referred to collectively as Stirling cycle machines in the present description and in any appended claims. Additional aspects of Stirling cycle machines and improvements thereto are discussed in a co-pending U.S. patent application entitled "Stirling Cycle Machine Improvements," filed Jul. 14, 1998, and incorporated herein by reference.

The principle of operation of a Stirling cycle engine is readily described with reference to FIGS. 1a–1f, wherein identical numerals are used to identify the same or similar parts. Many mechanical layouts of Stirling cycle engines are known in the art, and the particular Stirling engine designated generally by numeral 10 is shown merely for illustrative purposes. In FIGS. 1a to 1d, a piston 12 (otherwise referred to herein as a "compression piston") and a second piston (also known as an "expansion piston") 14 move in phased reciprocating motion within cylinder 16. Compression piston 12 and expansion piston 14 may also move within separate, interconnected, cylinders. Piston seals 18 prevents the flow of a working fluid contained within cylinder 16 between piston 12 and piston 14 from escaping around either piston 12. The working fluid is chosen for its thermodynamic properties, as discussed in the description below, and is typically helium at a pressure of several atmospheres. The volume of fluid governed by the position of expansion piston 14 is referred to as expansion space 22. The volume of fluid governed by the position of compression piston 12 is referred to as compression space 24. In order for fluid to flow between expansion space 22 and compression space 24, whether in the configuration shown or in another configuration of Stirling engine 10, the fluid passes through regenerator 26. Regenerator 26 is a matrix of material having a large ratio of surface area to volume which serves to absorb heat from the working fluid when the fluid enters hot from expansion space 22 and to heat the fluid when it passes from compression space 24 returning to expansion space 22.

During the first phase of the engine cycle, the starting condition of which is depicted in FIG. 1a, piston 12 compresses the fluid in compression space 24. The compression occurs at a constant temperature because heat is extracted from the fluid to the ambient environment. In practice, a cooler 68 (shown in FIG. 2) is provided, as will be discussed in the description below. The condition of engine 10 after compression is depicted in FIG. 1b. During the second phase of the cycle, expansion piston 14 moves in synchrony with compression piston 12 to maintain a constant volume of fluid. As the fluid is transferred to expansion space 22, it flows through regenerator 26 and acquires heat from regenerator 26 such that the pressure of the fluid increases. At the end of the transfer phase, the fluid is at a higher pressure and is contained within expansion space 22, as depicted in FIG. 1c.

During the third (expansion) phase of the engine cycle, the volume of expansion space 22 increases as heat is drawn in from outside engine 10, thereby converting heat to work. In practice, heat is provided to the fluid in expansion space 22 by means of a heater 64 (shown in FIG. 2) which is discussed in greater detail in the description below. At the end of the expansion phase, the hot fluid fills the full expansion space 22 as depicted in FIG. 1d. During the fourth phase of the engine cycle, the fluid is transferred from expansion space 22 to compression space 24, heating regenerator 26 as the fluid passes through it. At the end of the second transfer phase, the fluid is in compression space 24, as depicted in FIG. 1a, and is ready for a repetition of the compression phase. The Stirling cycle is depicted in a P-V (pressure-volume) diagram as shown in FIG. 1e and in a T-S (temperature-entropy) diagram as shown in FIG. 1f. The Stirling cycle is a closed cycle in that the working fluid is typically not replaced during the course of the cycle.

The principle of operation of a Stirling cycle refrigerator can also be described with reference to FIGS. 1a–1e, wherein identical numerals are used to identify the same or similar parts. The differences between the engine described above and a Stirling machine employed as a refrigerator are that compression volume 22 is typically in thermal communication with ambient temperature and expansion volume 24 is connected to an external cooling load (not shown). Refrigerator operation requires net work input.

Stirling cycle engines have not generally been used in practical applications, and Stirling cycle refrigerators have been limited to the specialty field of cryogenics, due to several daunting engineering challenges to their development. These involve such practical considerations as efficiency, vibration, lifetime, and cost. The instant invention addresses these considerations.

As used in this description and in any appended claims, the term "harmonic drive" will refer to a drive arrangement employing a gear set to interconvert rotary and sinusoidal linear motion. A harmonic crank drive has been applied to a diesel engine (as described by Moeller, "Prime Movers for Series Hybrid Vehicles," (Society of Automotive Engineers, Inc., 1997) and to a single piston of a Stirling engine, as described by Bartolini and Caresana, "A New Small Stirling Engine Prototype for Auxiliary Employements [sic] Aboard," (ASME, 1995), both of which publications are incorporated herein by reference. The single-piston embodiment of Bartolini and Caresana, however, suffers from a dynamic imbalance that may lead to inefficient operation and wear.

SUMMARY OF THE INVENTION

In accordance with one aspect of the invention, in one of its embodiments, there is provided a machine such as Stirling cycle engine. The machine has two pistons, each having a connecting rod and each undergoing reciprocating linear motion along respective rod axes within respective cylinders and each having a displacement with respect to fiducial points along the respective rod axes, the fiducial points fixed with respect to the respective cylinders. The second rod axis lies in a first plane parallel to the first rod axis and in a second plane forming an angle with respect to the first rod axis. Additionally, the machine has a harmonic drive linkage characterized by a net angular momentum. The harmonic drive linkage is coupled to the first and second connecting rods in such a manner that the displacement of the first piston along the first rod axis is a sinusoidal function of a crank angle and the displacement of the second piston along the second rod axis is a sinusoidal function of the crank angle, the displacement of the second piston being shifted in phase with respect to the displacement of the first piston along the first rod axis, the phase shift substantially equal to the angle between the second plane and the first rod axis. Finally, the machine has a working fluid contained within the first and second cylinders, the working fluid undergoing successive closed cycles of heating, expansion, cooling and compression.

In accordance with alternate embodiments of the invention, the linkage may have a primary crankshaft, an eccentric crankshaft disposed internally to the primary crankshaft, the eccentric crankshaft coupled to both the first connecting rod and the second connecting rod, and an epicyclic gear set coupling the eccentric crankshaft to the primary crankshaft in such a manner that the eccentric crankshaft and the primary crankshaft counterrotate. Alternatively, an eccentric crankshaft may be coupled to both the first connecting rod and the second connecting rod adjacent to the cantilevered end, and an epicyclic gear set may be disposed distally to the cantilevered end, the epicyclic gear coupling the eccentric crankshaft to the primary crankshaft in such a manner that the eccentric crankshaft is characterized by a forward angular momentum and the primary crankshaft is characterized by a backward angular momentum. The linkage may also have a flywheel coupled to the eccentric shaft such that the net angular momentum of the harmonic drive linkage is substantially zero.

In accordance with further alternate embodiments of the invention, the machine may also have a generator coupled to the primary crankshaft for converting mechanical to electrical energy and a processor for controlling a current load on the generator in such a manner as to provide a substantially constant torque on the primary crankshaft. The first and second connecting rods may be flexible with respect to bending in a direction transverse to the respective rod axes.

In accordance with yet further embodiments of the present invention, the machine may also have a heat exchanger for transferring thermal energy across a manifold from a first fluid to a second fluid, the heat exchanger comprising a plurality of pins extending from the manifold into the first and/or second fluid.

In accordance with a further aspect of the present invention, in one of its embodiments, there is provided an intake manifold for combining air and fuel having an auto-ignition temperature in such a manner as to form an air-fuel mixture for combustion in a chamber having a combustion axis so as to heat a heater head of the machine. The intake manifold may have a conduit having axial symmetry about the combustion axis with an inlet and an outlet for conveying radially inwardly flowing air, a fuel injector for injecting fuel into the radially inwardly flowing air in such a manner that the air and fuel mix to form an air fuel-mixture having a flow speed which is above the flame speed of the air-fuel mixture, and a bell-shaped throat having an inlet in fluid communication with the outlet of the conduit, the bell-shaped throat having an outlet, the bell-shaped throat further having a cross sectional contour and a cross sectional area such that the cross sectional area of the throat remains constant from inlet to outlet. There may be an air swirler disposed within the passageway for imparting a rotational component to the inwardly flowing air.

BRIEF DESCRIPTION OF THE DRAWINGS

The invention will be more readily understood by reference to the following description, taken with the accompanying drawings, in which:

FIG. 8b is a magnified perspective detail view of the pin heat exchanger of FIG. 8a;

FIG. 9b is a planar view of the system of branching ducts of FIG. 9a;

DETAILED DESCRIPTION OF PREFERRED EMBODIMENTS

Figure 1A:
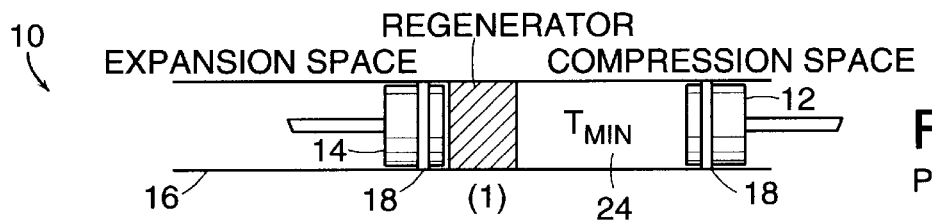
FIGS. 1a–1f depict the principle of operation of a prior art Stirling cycle machine.
Figure 1B:
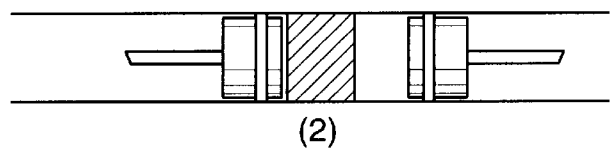
Figure 1C:
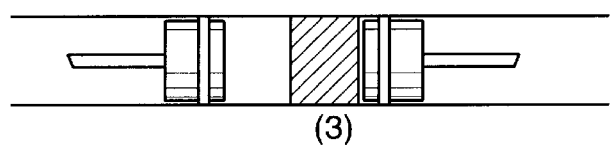
Figure 1D:
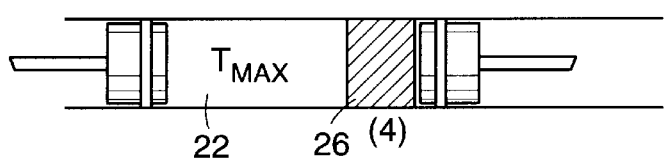
Figure 1E:
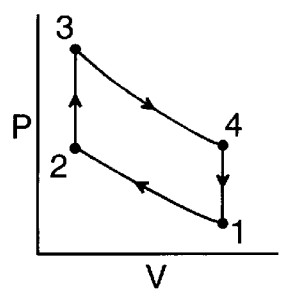
Figure 1F:
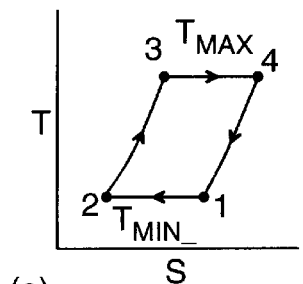
Figure 2:
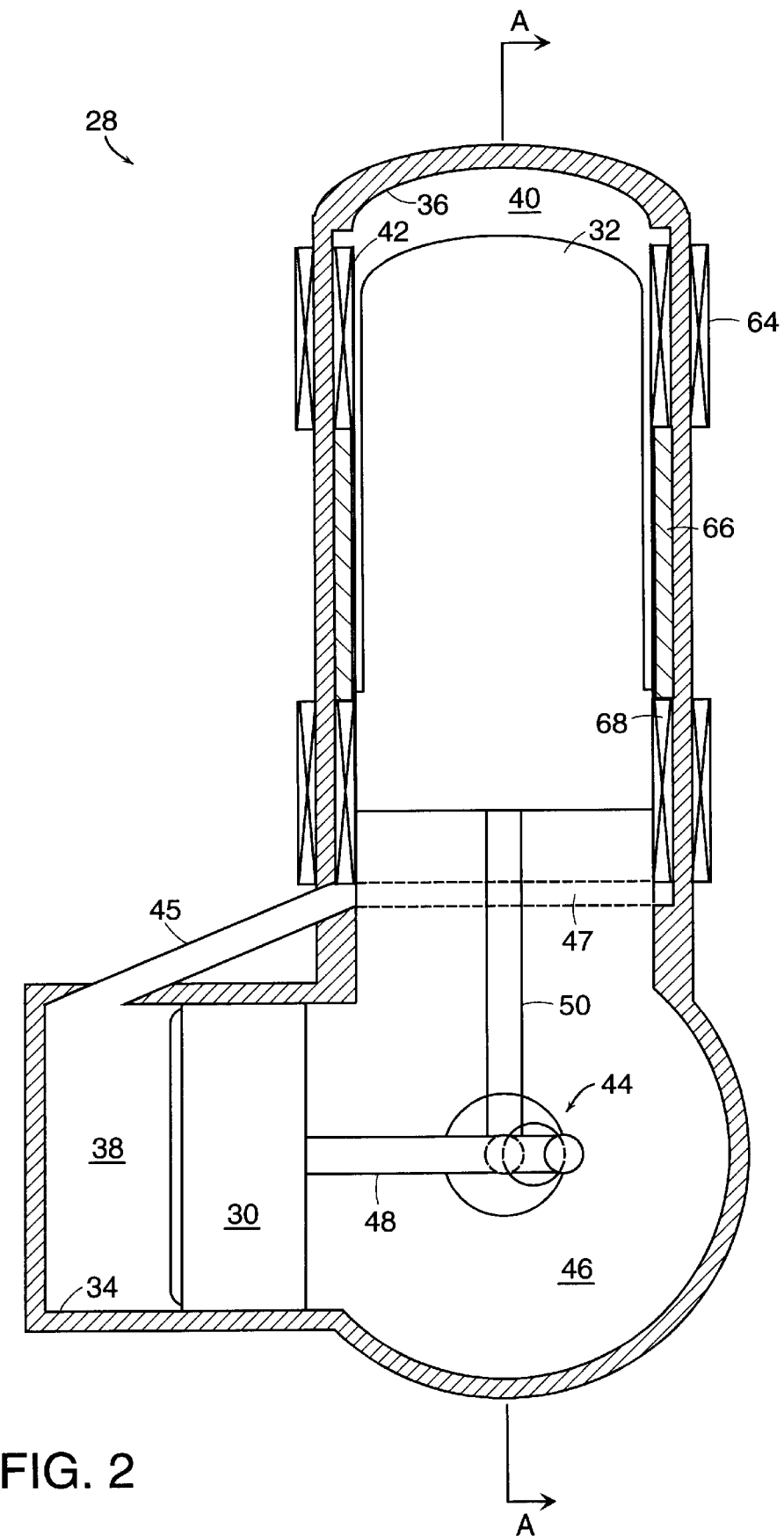
FIG. 2 is a side view in cross section of a Stirling cycle engine in accordance with an embodiment of the present invention.

Referring now to FIG. 2, a Stirling cycle engine, shown in cross-section, is designated generally by numeral 28. While the invention will be described generally with reference to the Stirling engine shown in FIG. 2, it is to be understood that many engines as well as refrigerators may similarly benefit from various embodiments and improvements which are subjects of the present invention. The configuration of Stirling engine 28 shown in FIG. 2 is referred to as an alpha configuration, characterized in that compression piston 30 and expansion piston 32 undergo linear motion within respective and distinct cylinders: compression piston 30 in compression cylinder 34 and expansion piston 32 in expansion cylinder 36.

In addition to compression piston 30 and expansion piston 32, the main components of Stirling engine 28 include heater 64, regenerator 66, and cooler 68. Compression piston 30 and expansion piston 32, referred to collectively as pistons, are constrained to move in reciprocating linear motion within respective volumes 38 and 40. A cylinder liner 42 may line the respective cylinder surfaces. The volumes of the cylinder interior proximate to the heater 64 and cooler 68 will be referred to, herein, as hot and cold sections, respectively, of engine 28. The relative phase (the "phase angle") of the reciprocating linear motion of compression piston 30 and expansion piston 32 is governed by their respective coupling to drive mechanism 44 housed in crankcase 46. Drive mechanism 44, discussed in greater detail below, is one example of various mechanisms known in the art of engine design which may be employed to govern the relative timing of pistons and to interconvert linear and rotary motion. Compression piston 30 and expansion piston 32 are coupled, respectively, to drive mechanism 44 via a first connecting rod 48 and a second connecting rod 50. The volume 38 of compression cylinder 34 is coupled to cooler 68 via duct 45 to allow cyclic cooling of working fluid. Duct 45, more particularly, couples compression volume 38 to the annular heat exchangers comprising cooler 68, regenerator 66, and heater 64. Branching of flow between duct 45 and annular plenum 47 is discussed below with reference to FIG. 9.

In accordance with a preferred embodiment of the invention, rods 48 and 50 may be fabricated with flexibility with respect to bending so as to accommodate drive misalignments (such as may arise due to pressurization and heating of the engine structure) while providing sufficient tensile and contractile stiffness to carry the requisite compressive loads without buckling. Rods 48 and 50 are preferredly fashioned from a high-strength metal, such as S-7 tool steel, for example, and are advantageously of ellipsoidal cross-section, although rods of any cross-section are within the scope of the present invention.

The operation of drive mechanism 44 is now discussed with reference to FIG. 3. In accordance with a preferred embodiment of the present invention, a novel linkage (which may be referred to as an "L-drive" linkage) is provided for coupling two members undergoing sinusoidal linear motion with a relative phase lag. An epicyclic gear set is designated generally by numeral 70. Epicyclic gear set 70 may be employed in accordance with an embodiment of the present invention for coupling the reciprocating linear motions of pistons 12 and 14 (shown in FIG. 1), referred to alternatively as compression piston 12 and expansion piston 14. Epicyclic gear set 70 consists of an internal gear 72 and a pinion gear 74, with the pitch diameter of internal gear 72 equal to twice the pitch diameter of pinion gear 74. When internal gear 72 remains fixed and pinion gear 74 is allowed to turn inside internal gear 72, each point on perimeter 76 of pinion gear 74 travels along a straight line with pure sinusoidal motion with respect to a fiducial point on the line.

Figure 3:
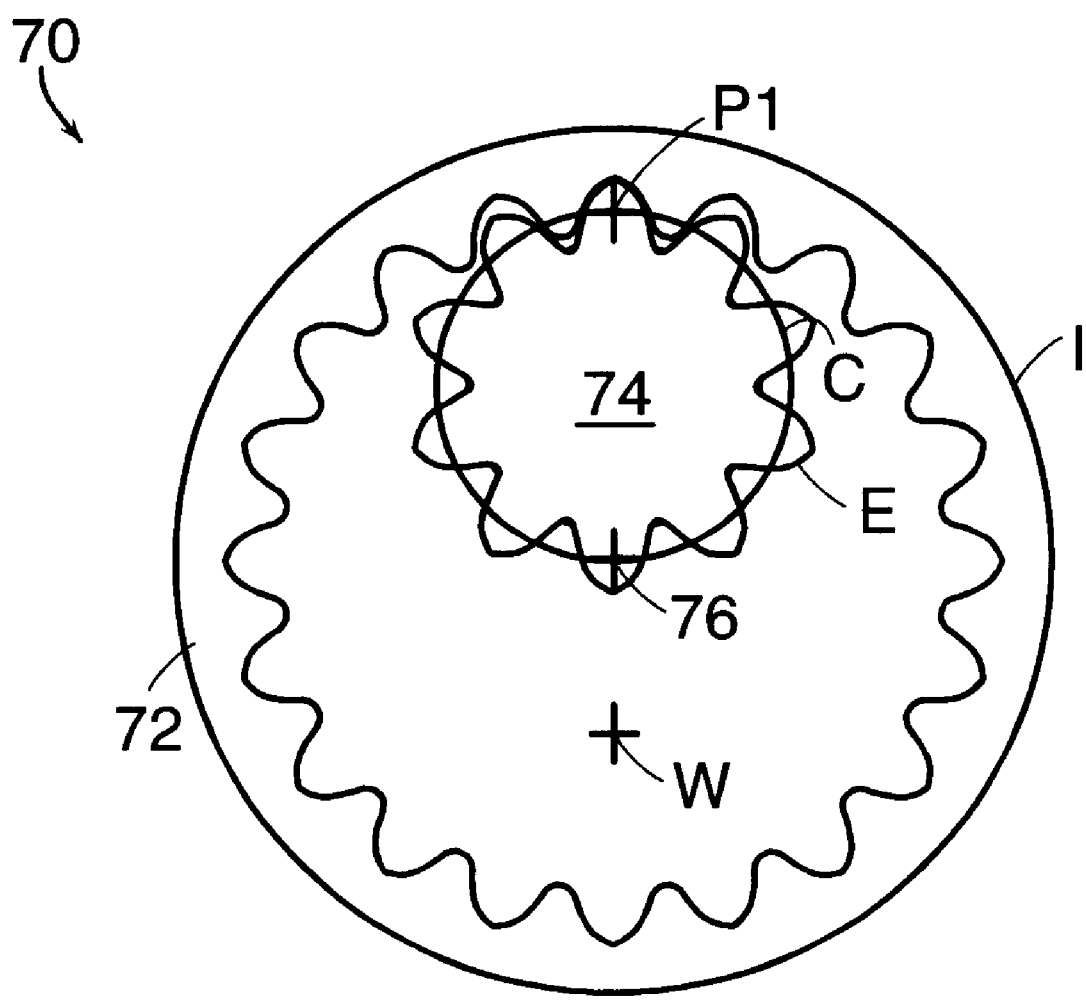
FIG. 3 is a schematic diagram in cross-section of an epicyclic gear set for coupling the reciprocating linear motions of a compression piston and expansion piston in accordance with an embodiment of the present invention.
Figure 4D:
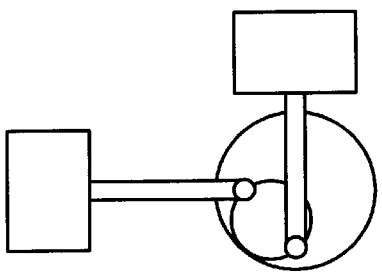
FIGS. 4a–4h depict the principle of operation of a Stirling cycle machine with eccentric linkage-coupled drive rods in accordance with an embodiment of the present invention.
Figure 4H:
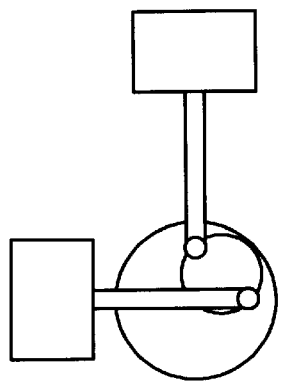
Figure 4C:
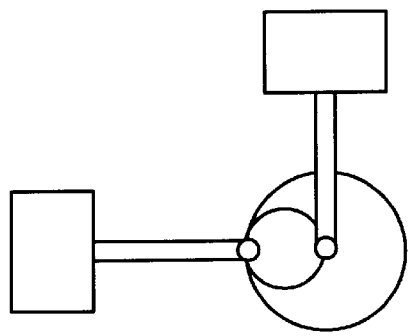
Figure 4G:
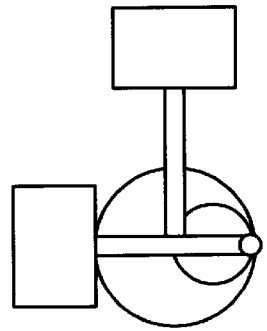
Figure 4B:
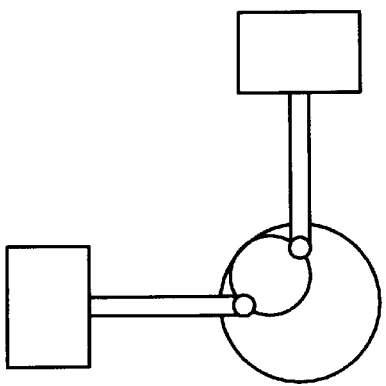
Figure 4F:
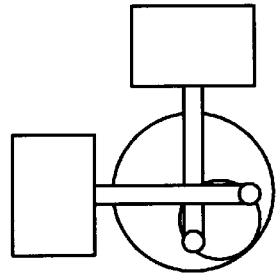
Figure 4A:
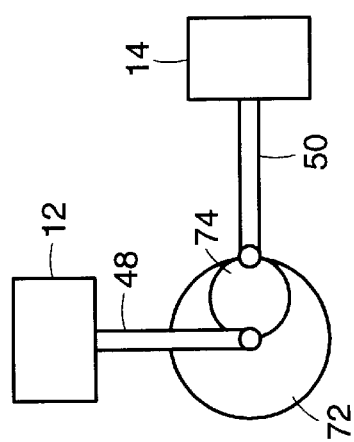
Figure 4E:
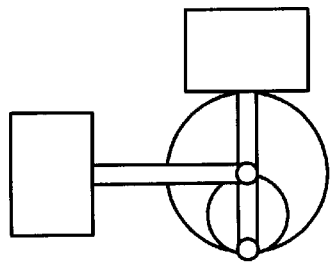

FIGS. 4a–4h show the respective linear travel of pistons 12 and 14 coupled via connecting rods 48 and 50 to opposite sides of pinion gear 74 turning with respect to fixed internal gear 72 as described in reference to FIG. 3. Pistons 12 and 14 move at an angle to each other, preferentially an angle within approximately 10° of perpendicular. Pistons 12 and 14 sweep out pure sinusoidal linear motion in a phase-angle relation substantially equal to the angular orientation of the axes of piston motion with respect to each other. Thus, for example, for piston travel oriented precisely orthogonally, pistons 12 and 14 move substantially in quadrature (90° out-of-phase) with respect to one another. Successive phases of the motion of pistons 12 and 14 with rotation of pinion gear 74 are shown in FIGS. 4a–4h.

Figure 5A:
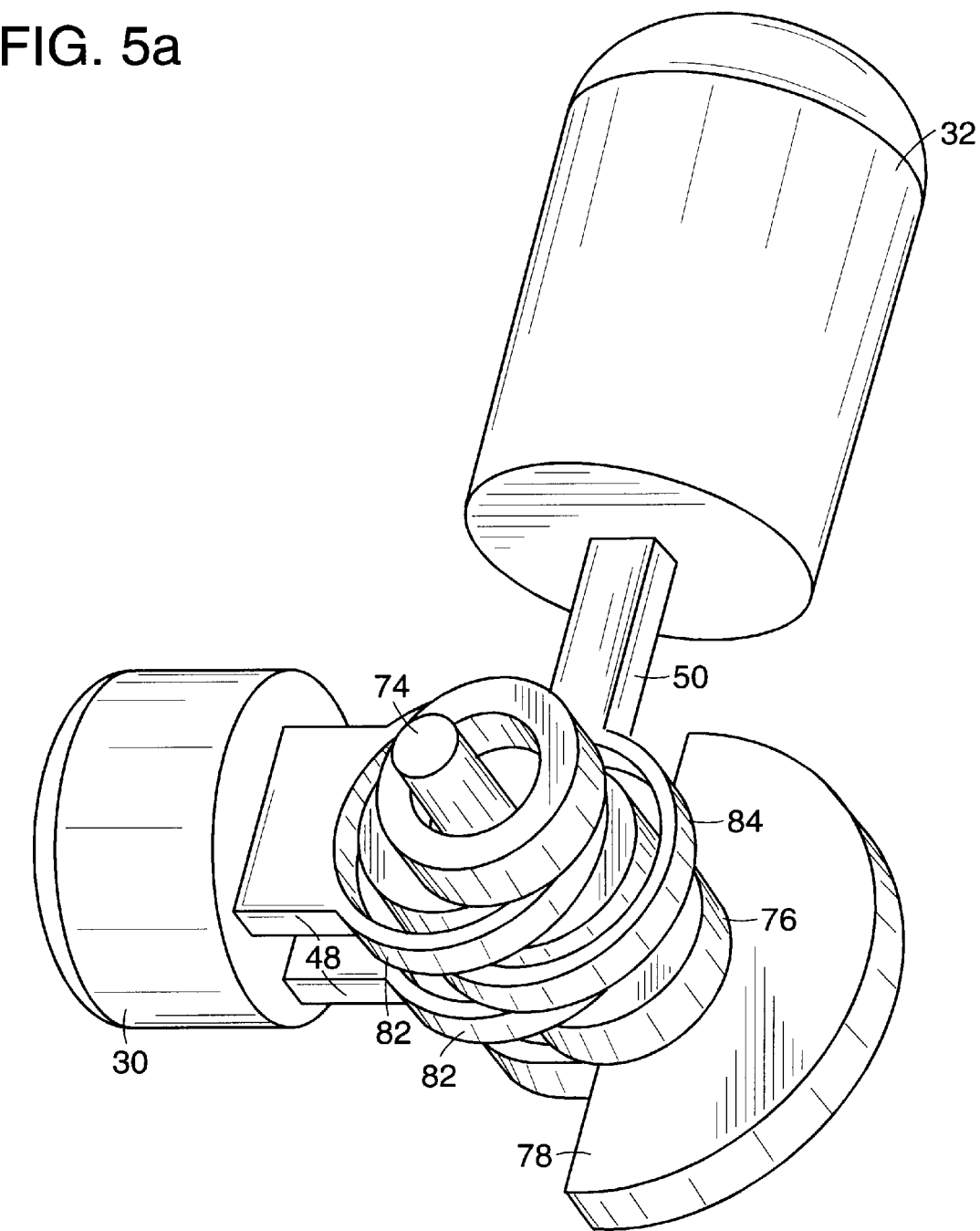
FIG. 5a is a perspective view of a novel L-linkage drive employed for coupling the orthogonal linear motion of two pistons of a Stirling cycle machine in accordance with an embodiment of the present invention.
Figure 5B:
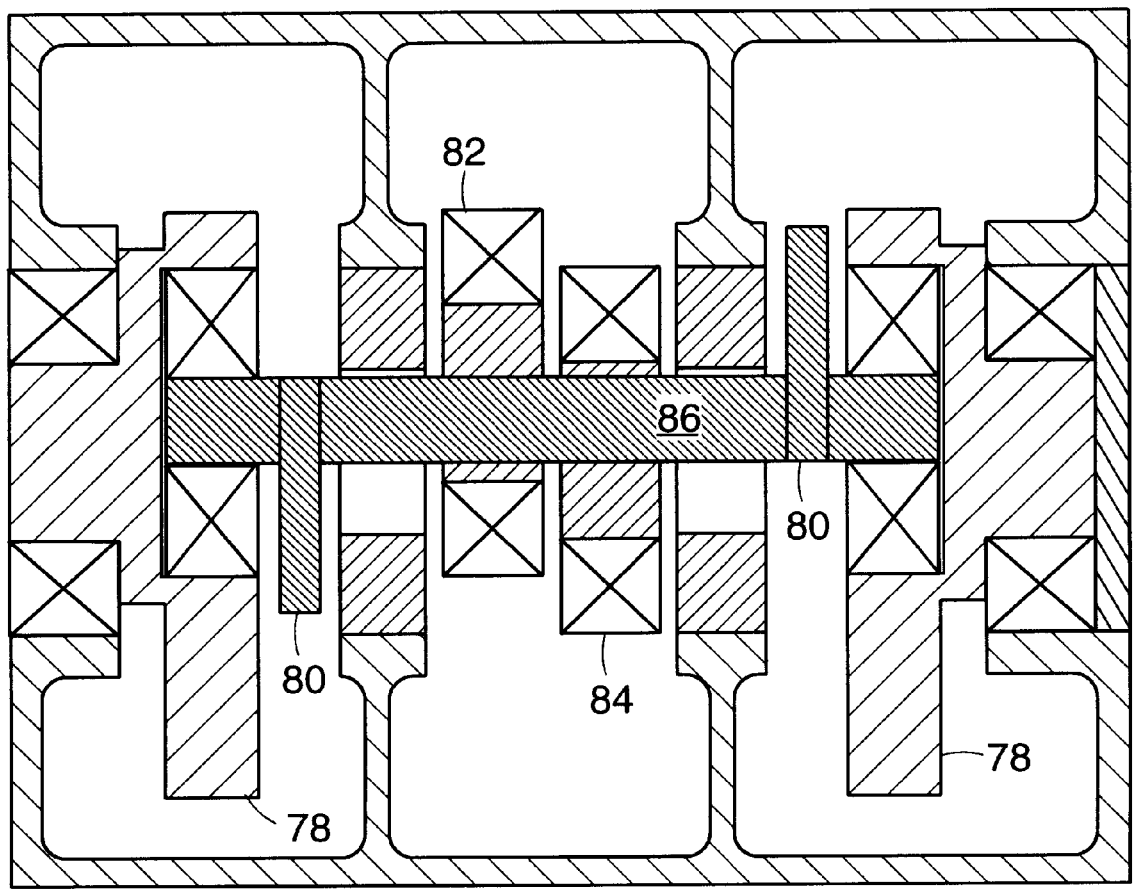
FIG. 5b is a side view in cross section of the L-linkage drive of FIG. 5a showing torsional counterweights in accordance with an embodiment of the present invention.
Figure 6B:
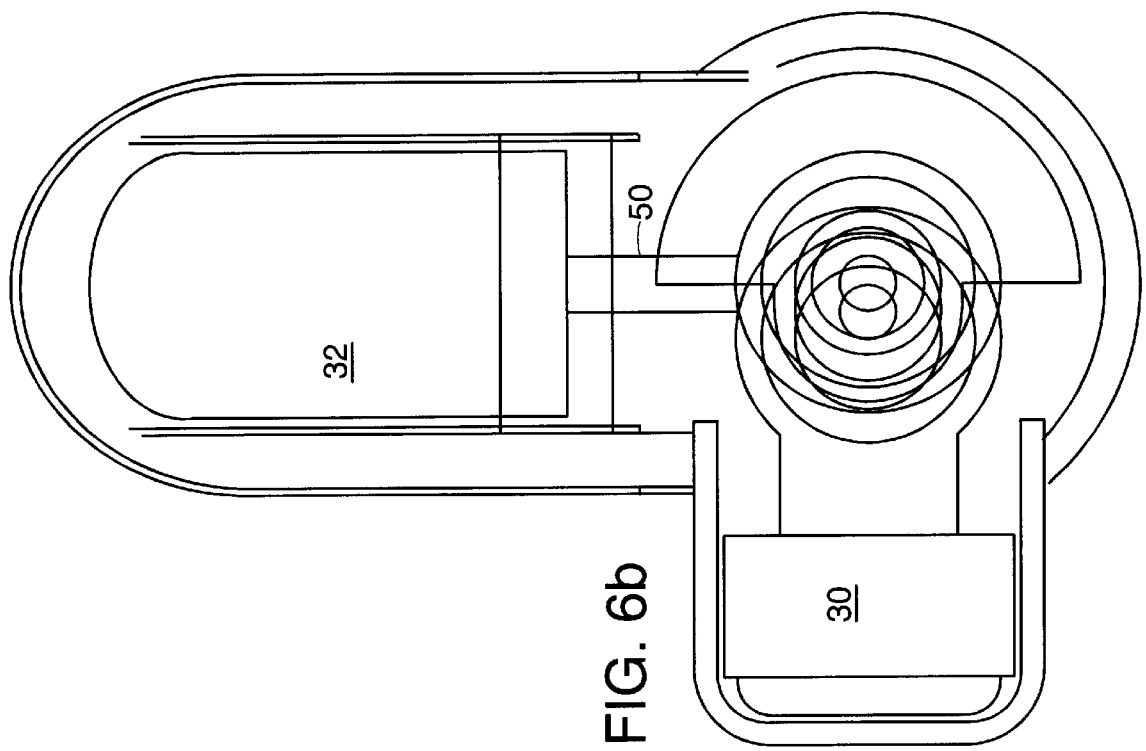
FIG. 6b is a side view in cross-section of the Stirling cycle machine of FIG. 6a employing the novel linkage for coupling the orthogonal linear motion of two pistons in accordance with an embodiment of the present invention.
Figure 6A:
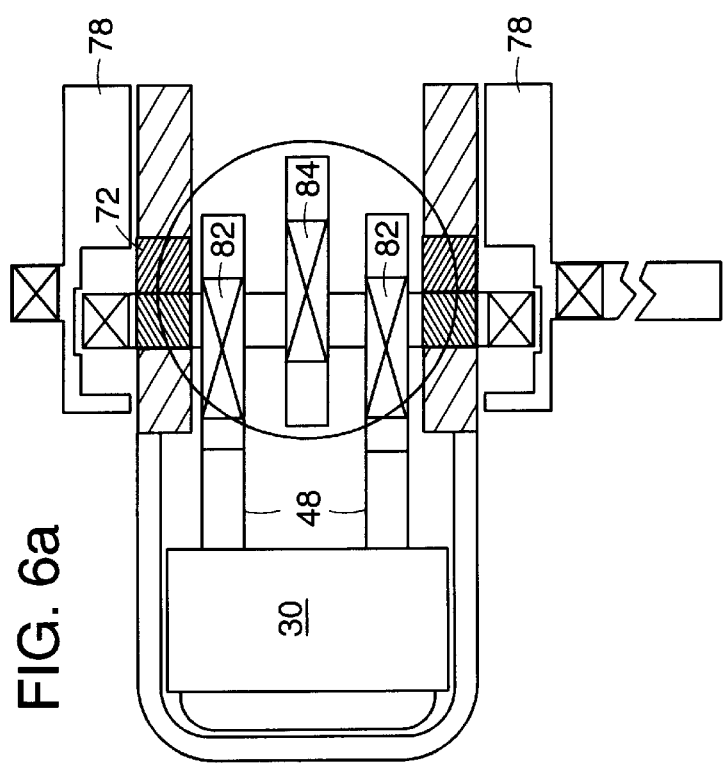
FIG. 6a is a top view in cross-section of a Stirling cycle machine employing a novel linkage for coupling the orthogonal linear motion of two pistons in accordance with an embodiment of the present invention.

Referring now to FIG. 5a, the use of a counterweight 78 rotating 180° out of phase with pinion gear 74 allows the engine to be dynamically balanced. Referring to the cross-sectional view of the drive shown in FIG. 5b, it is not necessary to load the drive symmetrically about its center line provided that a set of "torsional counterweights" 80 are added about the axis of eccentric crankshaft 86. The set of two opposing counterweights 80, provided in addition to primary counterweight 78, may balance the moments created by the offset pistons while primary counterweight 78 balance the engine in translation. In the embodiment of the invention depicted in perspective in FIG. 5a and in cross-sectional top and side views in FIGS. 5b, 6a and 6b, counterweights 78 are provided to rotate in counterphase to compression piston bearings 82 and expansion piston bearing 84 respectively. The linkage drive embodiments of the present invention require far fewer parts than a rhombic drive mechanism, described in further detail below. Additionally, the volume displaced by the novel linkage drive is smaller than the volume of the displacement of a rhombic drive with the same piston stroke. Additionally, the sinusoidal motion of the two perpendicular pistons may be perfectly balanced with a simple counterweight, and does not put side loads on the piston seals, thereby reducing friction, increasing engine lifetime, and allowing dry operation.

Figure 7A:
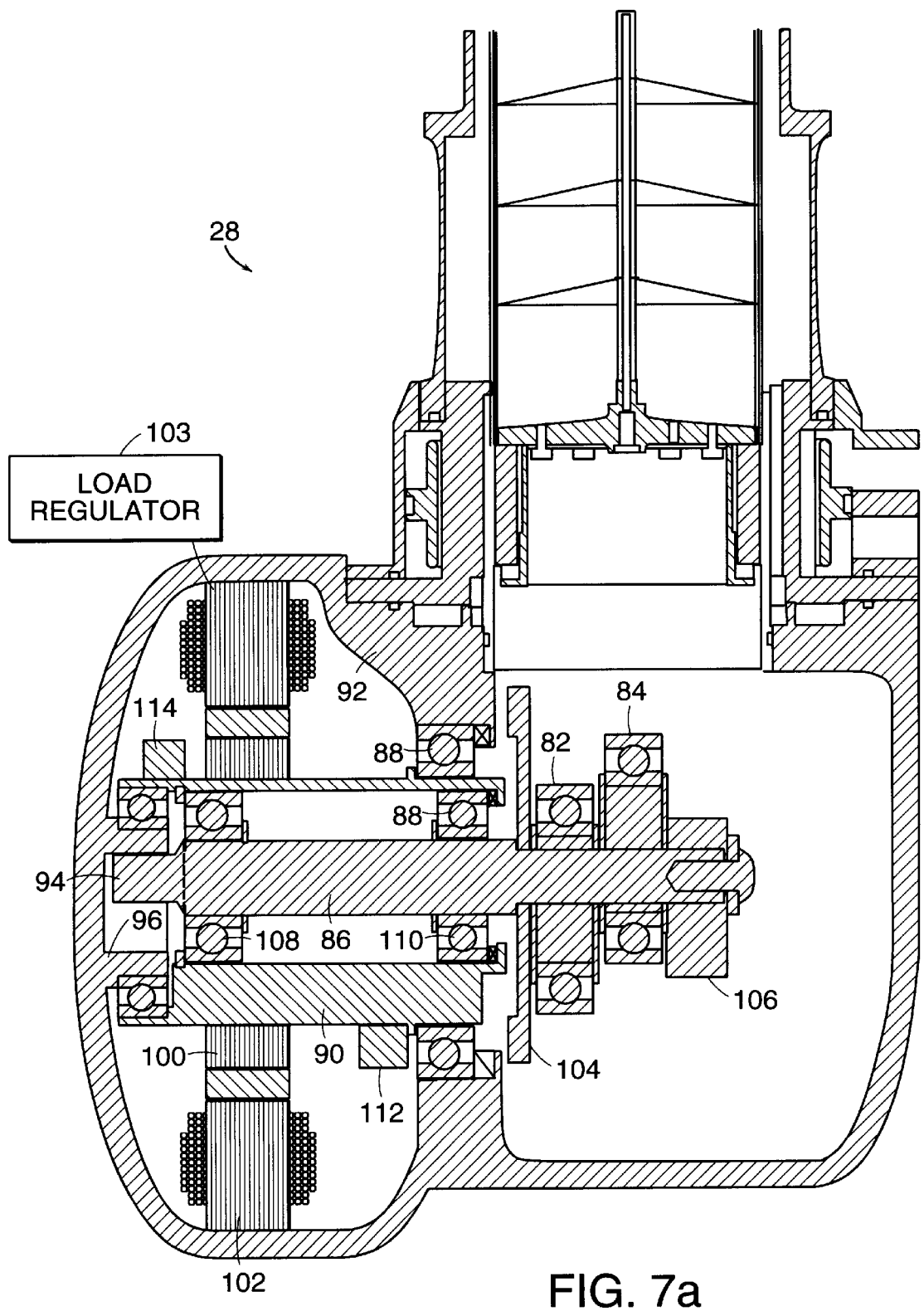
FIG. 7a is a cross-section through line AA of FIG. 2 of a Stirling cycle engine showing a cantilevered crankshaft in accordance with an embodiment of the present invention.

Referring now to FIG. 7a, a cross-sectional view is shown of Stirling engine 28 taken along cut AA of FIG. 2. Eccentric compression piston bearings 82 and expansion piston bearing 84 are disposed about eccentric crankshaft 86 as cantilevered from main bearing set 88 which supports primary (or "outer") crankshaft 90 with respect to the housing 92 of engine 28. Eccentric crankshaft 86 rotates about an axis eccentric to primary crankshaft 90, driving primary crankshaft 90 in an opposite sense of rotation, at the same speed of rotation, by virtue of pinion gear 94 and internal gear 96, together comprising epicyclic gear set 98, as described with reference to FIG. 3. The position of primary crankshaft 90 with respect to an arbitrary point fixed with respect to the engine defines a "crank angle." Crankshafts configured in this manner may be referred to as "harmonic crankshafts."

Figure 7B:
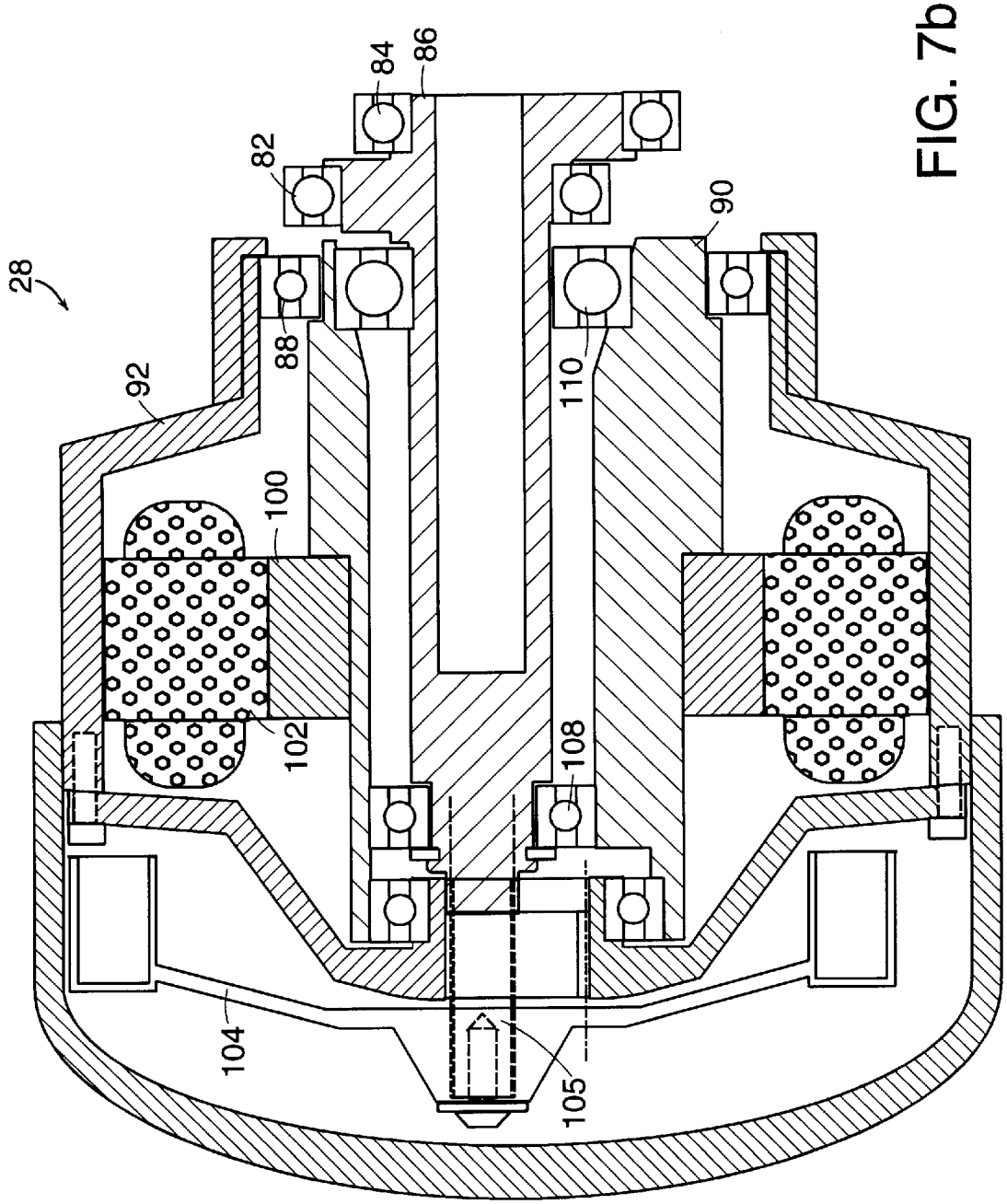
FIG. 7b is a cross-section through line AA of FIG. 2 of a Stirling cycle engine showing a cantilevered crankshaft in accordance with an alternate embodiment of the present invention wherein the flywheel is disposed at the end of the eccentric crankshaft distal to the engine cylinders.

The cantilevered crankshaft configuration advantageously allows lubrication of gear set 98 without contamination of the Stirling engine working fluid which must be kept clean so as not to contaminate the regenerator and compromise the efficient operation of the engine. Primary crankshaft 90, in turn, may impart torque to a mechanical load. An example of a mechanical load is generator rotor 100, rotationally driven with respect to generator stator 102 for generating electrical energy. Eccentric flywheel 104 and linear counterweight 106 are coupled to eccentric crankshaft 86 and thus cantilevered about main bearing set 88. Eccentric flywheel 104 is provided in order that the net angular momentum, including the rotational momentum of the forward rotating components and that of the backward-rotating components, is zero. Thus, vibration of the engine due to variations in engine speed are advantageously avoided. Eccentric flywheel 104 may, within the scope of the invention, be otherwise disposed than as shown in FIG. 7a. For example, referring to FIG. 7b, an alternate embodiment of the Stirling engine of FIG. 2 is shown in cross-section, wherein eccentric flywheel 104 is disposed at the end 105 of eccentric crankshaft 86 distal to the location of piston bearings 82 and 84. Referring again to FIG. 7a, eccentric crankshaft 86 is supported with respect to primary crankshaft 90 by bearings 108 and 110. A primary counterweight 112 and torsional counterweight 114 are provided for dynamic balance of primary crankshaft 90 with respect to the whole eccentric crankshaft assembly, including the pistons.

The load on primary crankshaft 90 preferentially does not change direction over the course of a cycle of the engine. In this way, by virtue of the balance of forward and backward inertia, torque reversal on epicyclic gear set 98 is advantageously prevented, thereby preventing noise and wear associated with gear backlash. If the load on the primary axle 90 is constant, the torque on epicyclic gear set 98 is unidirectional and is also minimized for a given net power output. If the applied load is an electric generator, constant torque operation also results in the highest generator efficiency. Additionally, in accordance with an embodiment of the invention, the current load on the generator may be regulated, such as by load regulator 103 which may be a processor, as known in the electrical arts, for providing a constant torque on epicyclic gear set 98 for realizing the described advantageous operation. Additionally, generator rotor 100 may provide all or part of the mass of a flywheel, and the generator may also function as a starter for starting the engine.

Figure 8A:
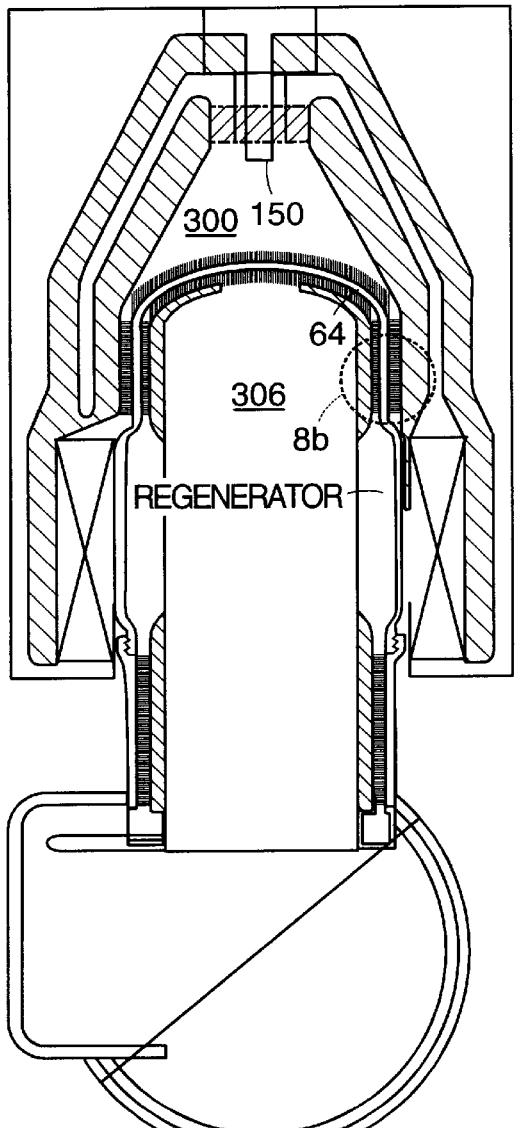
FIG. 8a is a cross-sectional view of a Stirling cycle engine employing a pin heat exchanger, in accordance with an embodiment of the present invention.
Figure 8B:
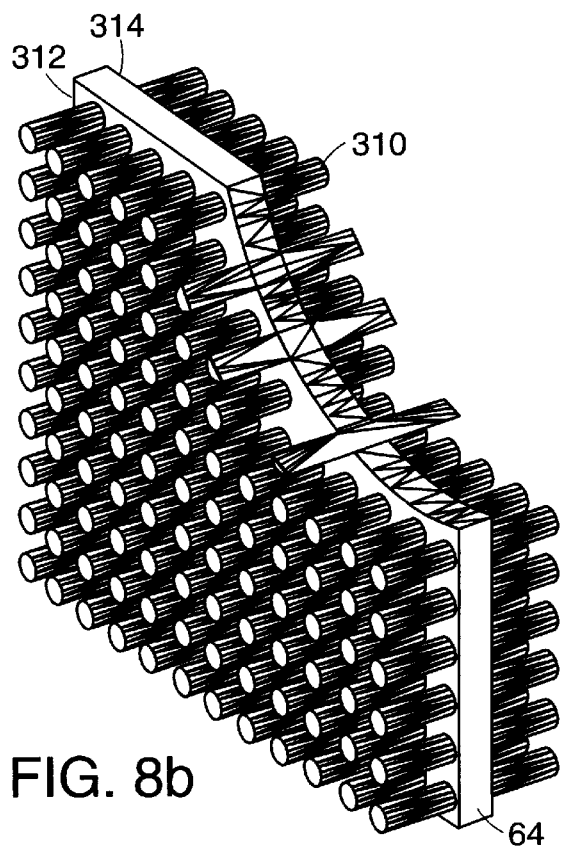

Referring now to FIGS. 8a and 8b, a novel structure is depicted, in accordance with an embodiment of the present invention, for transferring large amounts of heat from the combustion source to the interior of Stirling cycle engine 28, shown in cross section. In order to increase the efficiency of heat transfer from hot gases 300, generated by burner 150, to the working fluid contained in the interior volume 306 of the engine, a large wetted surface area, on either side of heater head 64 is required. To achieve the high surface area, a large number of metal pins 310 are fabricated on both the interior surface 312 and exterior surface 314 of heater head 64. Fabrication may be accomplished at low cost, such as by investment casting. Metal pins 310 not only increase the wetted surface area on either side of heater head 64 but also create turbulent wakes that increase fluid mixing and thereby further increase the flow of heat. This structure may also be employed for heat transfer at the cooler 68 (shown in FIG. 2) or in any application where efficient heat transfer is required between volumes of gases.

Figure 9B:
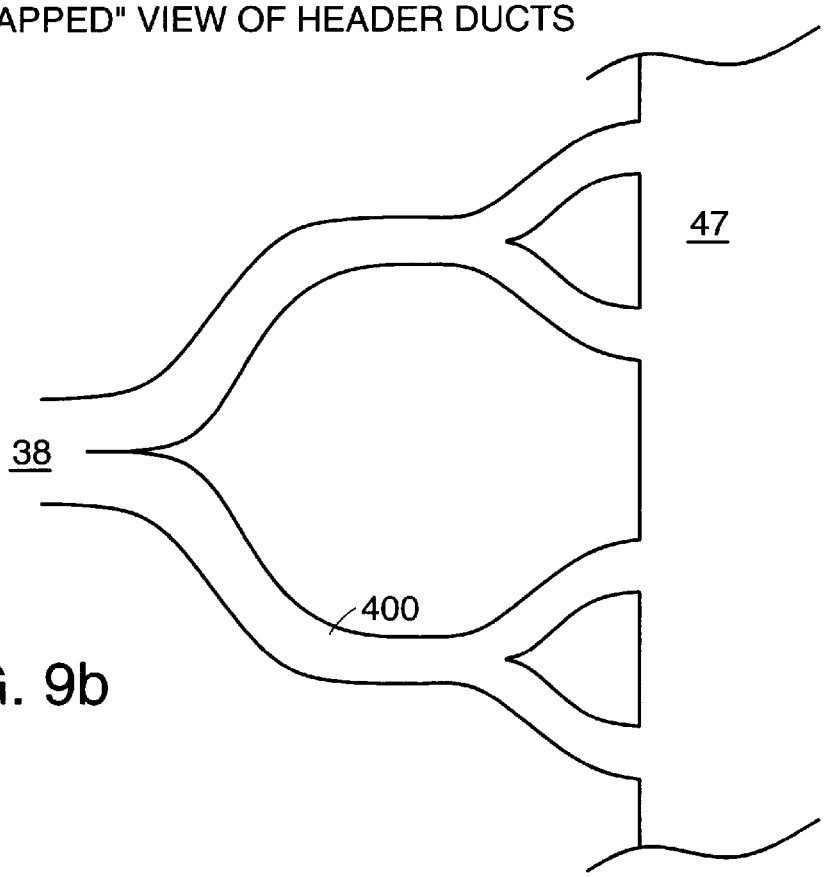
Figure 9A:
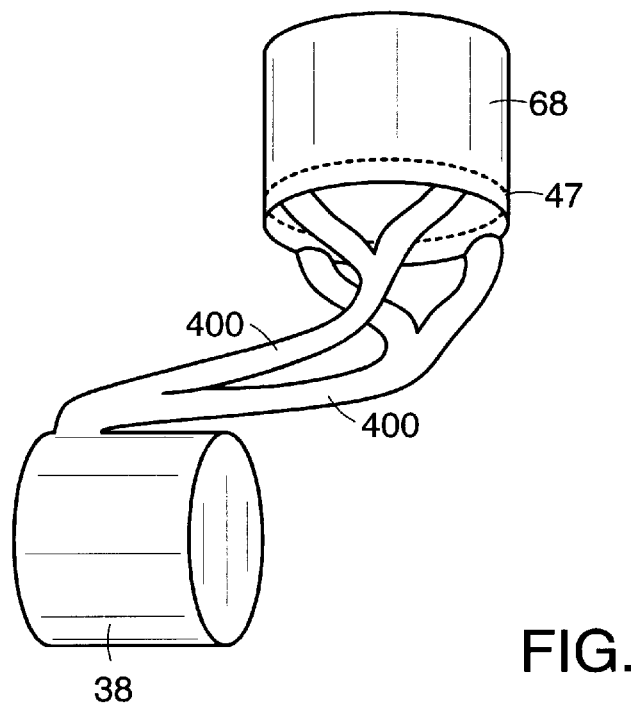
FIG. 9a is a perspective view from the bottom of the Stirling cycle engine of FIG. 2, showing branching ducts for enhancing flow uniformity in accordance with an embodiment of the present invention.

Referring to FIG. 9a, a perspective view is shown of a system of header ducts 400 providing for the flow of working fluid between compression volume 38 and the annular region of fluid flow through the heat exchange network, namely past cooler head 68, through regenerator 66 (shown in FIG. 2), and past heater head 64 (shown in FIG. 2). The annular flow of working fluid culminates at annular header 47 to which branching ducts 400 are coupled for creating equal-length flow passages between cylinder volume 38 and the entire annular region of header 47. By substantially equalizing the flow impedance between every portion of the annular flow region and the cylinder volume, losses due to flow non-uniformities through the heat exchangers may be advantageously reduced, and, additionally, the flow of working fluid within a loop confined to the heat exchange region and thereby lost for purposes of mechanical work may be minimized. FIG. 9b shows a schematic of the system of branching ducts 400 of FIG. 9a, "unwrapped" into a planar view, showing the fluid communication via branching ducts 400 between compression space 38 and annular header 47.

While Stirling engines are capable of providing high thermal efficiency and low emission of pollutants, these objectives impose requirements of thermal efficiency, in particular, on a burner employed to heat heater head 64 (shown in FIG. 2) of the Stirling engine. Components of such thermal efficiency include the efficient pumping of oxidant (typically, air, and, referred to herein and in any appended claims, without limitation, as "air") through the burner to provide combustion, and the recovery of hot exhaust leaving the heater head. In many applications, air (or other oxidant) is pre-heated, prior to combustion, nearly to the temperature of the heater head, so as to achieve the stated objectives of thermal efficiency.

In order to achieve low emissions, the fuel and air must be well-mixed with sufficient amounts of oxygen to limit the emission of carbon monoxide (CO) and, additionally, must be burned at low enough flame temperatures to limit the formation of oxides of nitrogen ($NO_x$). The high temperature of preheated air, desirable for achieving high thermal efficiency, complicates achieving low-emission goals by making it difficult to premix the fuel and air and requiring large amounts of excess air in order to limit the flame temperature.

As used herein and in any appended claims, the term "auto-ignition temperature" is defined as the temperature at which a fuel will ignite without a temperature-decreasing catalyst under existing conditions of air and fuel pressure. The typical preheated air temperature exceeds the auto-ignition temperature of most fuels, potentially causing the fuel-air mixture to ignite before entering the combustion chamber. One solution to this problem is to use a non-premixed diffusion flame. However, since such diffusion flames are not well-mixed, higher than desirable emissions of CO and $NO_x$ result. A detailed discussion of flame dynamics is provided by Turns, *An Introduction to Combustion: Concepts and Applications*, (McGraw-Hill, 1996), which is incorporated herein by reference. Any increased air flow provided to limit flame temperatures typically increases the power consumed by an air pump or blower, thereby degrading overall engine efficiency.

In accordance with the present invention, low emissions and high efficiency may be provided by producing a pre-mixed flame even in the presence of air heated above the auto-ignition temperature of the fuel, and, additionally, by minimizing the pressure drop between the air inlet and the flame region, thereby minimizing blower power consumption, as now discussed.

The term "flame speed" is defined as the speed at which a flame front will propagate through a particular fuel-air mixture. Within the specification and the following claims, the term "combustion axis" shall refer to the direction of predominant fluid flow upon combustion of the fluid.

Figure 10A:
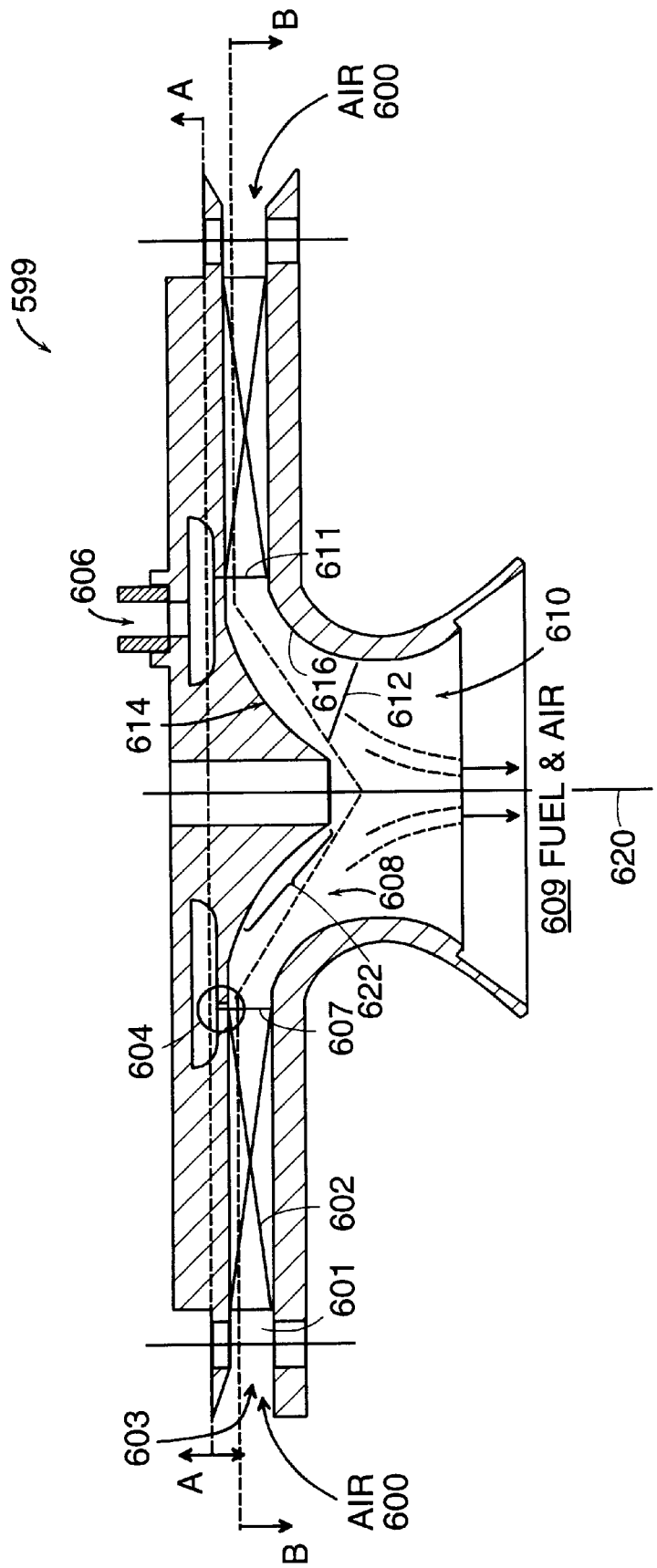
FIG. 10a shows a cross-sectional view from the side of a fuel intake manifold for a Stirling cycle engine in accordance with a preferred embodiment of the invention.
Figure 10B:
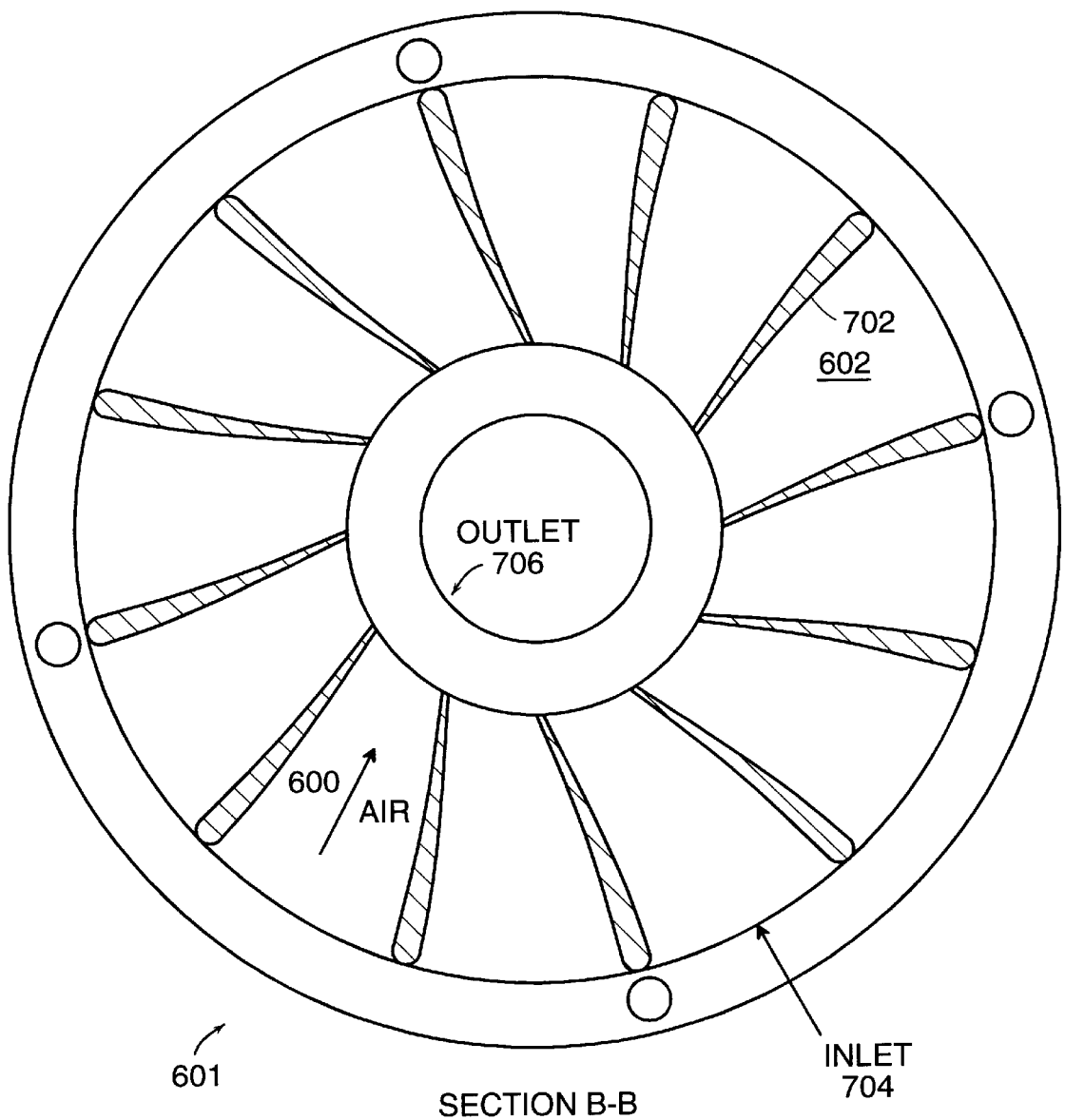
FIG. 10b shows a cross sectional view from the top of the fuel intake manifold of FIG. 10a taken through cut BB.
Figure 10C:
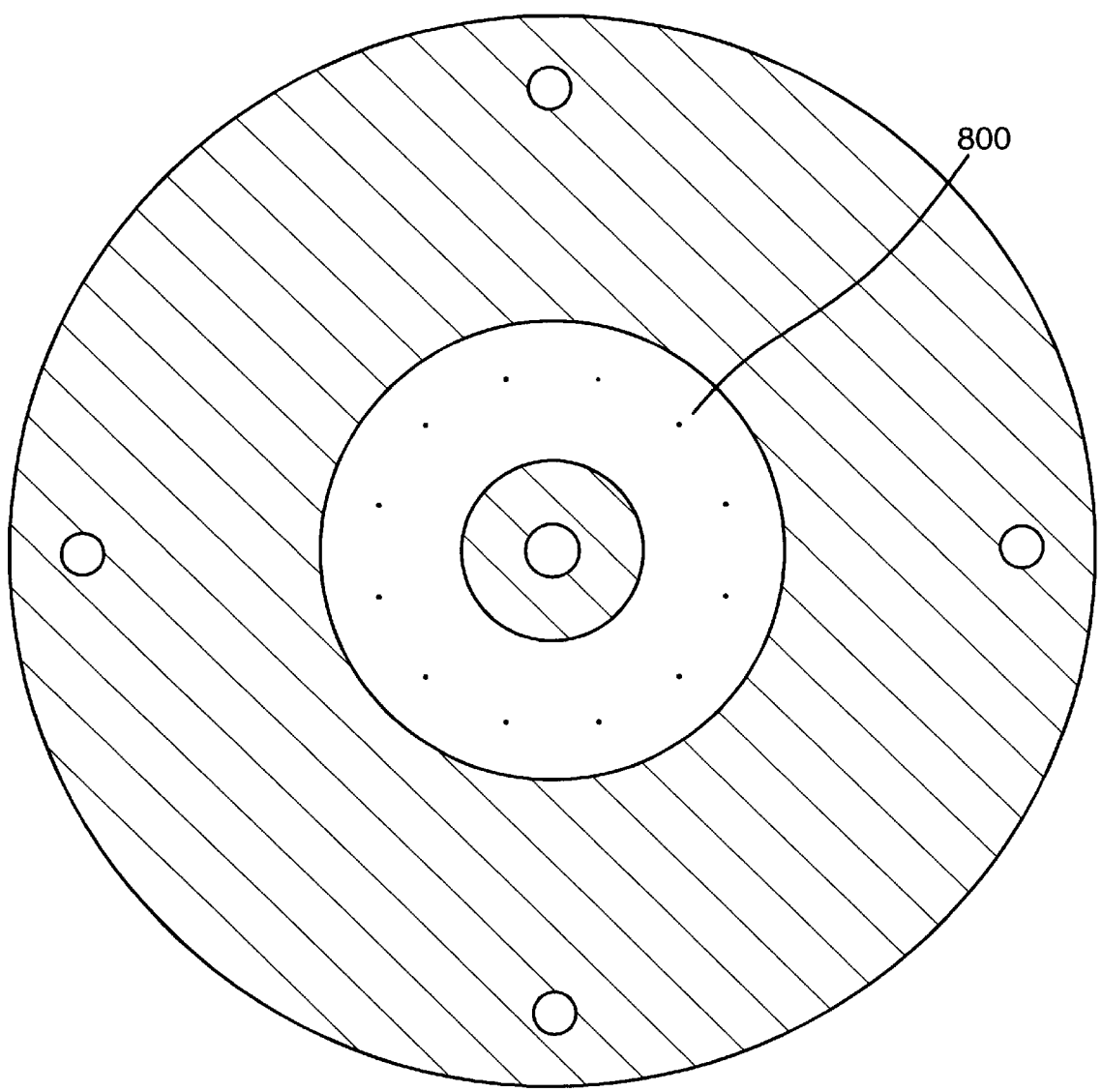
FIG. 10c is a cross sectional view from the top of the fuel intake manifold of FIG. 10a taken through cut AA, showing the fuel jet nozzles.

Referring now to FIGS. 10*a*–10*c*, an intake manifold 599 is shown for application to a Stirling cycle engine or other combustion application in accordance with an embodiment of the present invention. In accordance with a preferred embodiment of the invention, fuel is pre-mixed with air that may be heated above the fuel's auto-ignition temperature and a flame is prevented from forming until the fuel and air are well-mixed. FIG. 10*a* shows a preferred embodiment of the apparatus including an intake manifold 599 and a combustion chamber 610. The intake manifold 599 has an axisymmetrical conduit 601 with an inlet 603 for receiving air 600. Air 600 is pre-heated to a temperature, typically above 1000 K, which may be above the auto-ignition temperature of the fuel. Conduit 601 conveys air 600 flowing inward radially with respect to combustion axis 620 to a swirler 602 disposed within the conduit 601.

FIG. 10*b* shows a cross sectional view of the conduit 601 including swirler 602 in accordance with an embodiment of the invention. In the embodiment of FIG. 10*b*, swirler 602 has several spiral-shaped vanes 702 for directing the flow of air 600 radially inward and imparting a rotational component on the air. The diameter of the swirler section of the conduit decreases from the inlet 704 to the outlet 706 of swirler 602 as defined by the length of swirler vanes 702. The decrease in diameter of swirler vanes 702 increases the flow rate of air 600 in substantially inverse proportion to the diameter. The flow rate is increased so that it is above the flame speed of the fuel. At outlet 706 of swirler 602, fuel 606, which in a preferred embodiment is propane, is injected into the inwardly flowing air.

In a preferred embodiment, fuel 606 is injected by fuel injector 604 through a series of nozzles 800 as shown in FIG. 10*c*. More particularly, FIG. 10*c* shows a cross sectional view of conduit 601 and includes the fuel jet nozzles 800. Each of the nozzles 800 is positioned at the exit of the swirler vanes 702 and is centralized between two adjacent vanes. Nozzles 800 are positioned in this way for increasing the efficiency of mixing the air and fuel. Nozzles 800 simultaneously inject the fuel 606 across the air flow 600. Since the air flow is faster than the flame speed, a flame will not form at that point even though the temperature of the air and fuel mixture is above the fuel's auto-ignition temperature. In a preferred embodiment, where propane is used, the preheat temperature, as governed by the temperature of the heater head, is approximately 1000 K.

Referring again to FIG. 10*a*, the air and fuel, now mixed, referred to hereafter as "air-fuel mixture" 609, is transitioned in direction through a throat 608 which has a contoured fairing 622 and is attached to the outlet 607 of the conduit 601. Throat 608 has an inner radius 614 and an outer dimension 616. The transition of the air-fuel mixture is from a direction which is substantially transverse and radially inward with respect to combustion axis 620 to a direction which is substantially parallel to the combustion axis. The contour of the fairing 622 of throat 608 has the shape of an inverted bell such that the cross sectional area of throat 608 with respect to the combustion axis remains constant from the inlet 611 of the throat to outlet 612 of the throat. The contour is smooth without steps and maintains the flow speed from the outlet of the swirler to the outlet of the throat 608 to avoid separation and the resulting recirculation along any of the surfaces. The constant cross sectional area allows the air and fuel to continue to mix without decreasing the flow speed and causing a pressure drop. A smooth and constant cross section produces an efficient swirler, where swirler efficiency refers to the fraction of static pressure drop across the swirler that is converted to swirling flow dynamic pressure. Swirl efficiencies of better than 80% may typically be achieved by practice of the invention. Thus, the parasitic power drain of the combustion air fan may be minimized.

Outlet 612 of the throat flares outward allowing the air-fuel mixture 609 to disperse into the chamber 610 slowing the air-fuel mixture 609 thereby localizing and containing the flame and causing a toroidal flame to form. The rotational momentum generated by the swirler 602 produces a flame stabilizing ring vortex as well known in the art.

The devices and methods described herein may be applied in other applications besides the Stirling engine in terms of which the invention has been described. The described embodiments of the invention are intended to be merely exemplary and numerous variations and modifications will be apparent to those skilled in the art. All such variations and modifications are intended to be within the scope of the present invention as defined in the appended claims.

We claim:

1. A machine comprising:
   a. a first piston having a first connecting rod, the piston undergoing reciprocating linear motion along a first rod axis within a first cylinder and having a displacement along the first rod axis with respect to a first fiducial point disposed along the first rod axis and fixed with respect to the first cylinder;
   b. a second piston having a second connecting rod, the second piston undergoing reciprocating linear motion within a second cylinder along a second rod axis, the second rod axis lying in a first plane parallel to the first rod axis and in a second plane forming an angle with respect to the first rod axis, the second piston having a displacement along the second rod axis with respect to a second fiducial point disposed along the second rod axis and fixed with respect to the second cylinder;
   c. a harmonic drive linkage having a net annular momentum, the harmonic drive linkage coupled to the first and second connecting rods in such a manner that the displacement of the first piston along the first rod axis is a sinusoidal function of a crank angle and the displacement of the second piston alone the second rod axis is a sinusoidal function of the crank angle, the displacement of the second piston being shifted in phase with respect the displacement of the first piston along the first rod axis, the phase shift substantially equal to the angle between the second plane and the first rod axis; and
   d. a working fluid contained within the first and second cylinders, the working fluid undergoing successive closed cycles of heating, expansion, cooling and compression;

e. wherein the linkage comprises:
  i) a primary crankshaft;
  ii) an eccentric crankshaft having a cantilevered end, the eccentric crankshaft disposed internally to the primary crankshaft, the eccentric crankshaft coupled to both the first connecting rod and the second connecting rod adjacent to the cantilevered end; and
  iii) an epicyclic gear set disposed distally to the cantilevered end, the epicyclic gear coupling the eccentric crankshaft to the primary crankshaft in such a manner that the eccentric crankshaft is characterized by a forward angular momentum and the primary crankshaft is characterized by a backward angular momentum.

2. A machine according to claim 1, wherein the epicyclic gear set comprises:
  a. an internal gear having a pitch diameter, the internal gear disposed in a plane substantially parallel to both the first and second rod axes; and
  b. a pinion gear having a pitch diameter equal to half the pitch diameter of the fixed internal gear, the pinion gear coupled to eccentric crankshaft.

3. A machine according to claim 1, wherein the linkage further comprises at least one counterweight rotating in counterphase with the pinion gear.

4. A machine according to claim 1, further comprising a flywheel coupled to the eccentric shaft such that the net angular momentum of the harmonic drive linkage is substantially zero.

5. A machine according to claim 1, further including a generator coupled to the primary crankshaft for converting mechanical to electric energy.

6. A machine according to claim 5, further including a processor for controlling a current load on the generator in such a manner as to provide a substantially constant torque on the primary crankshaft.

7. A machine according to claim 1, wherein the first connecting rod is flexible with respect to bending in a direction transverse to the first rod axis.

8. A machine according to claim 1, wherein the second connecting rod is flexible with respect to bending in a direction transverse to the second rod axis.

9. A machine according to claim 1, further including a heat exchanger for transferring thermal energy across a manifold from a first fluid to a second fluid, the heat exchanger comprising a plurality of pins extending from the manifold into the first fluid.

10. A machine according to claim 1 further including a heat exchanger for transferring thermal energy across a manifold from a first fluid to a second fluid, the heat exchanger comprising a plurality of pins extending from the manifold into the second fluid.

11. A machine according to claim 1, further including a heat exchanger for transferring thermal energy across a manifold from a first fluid to a second fluid, the heat exchanger comprising:
  a. a plurality of pins extending from the manifold into the first fluid; and
  b. a plurality of pins extending from the manifold into the second fluid.

12. A machine according to claim 1, further comprising an intake manifold for combining air and a fuel having an auto-ignition temperature in such a manner as to form an air-fuel mixture for combustion in a chamber having a combustion axis so as to heat a heater head of the machine, the air-fuel mixture having a flame speed, the intake manifold comprising:
  a. a conduit having axial symmetry about the combustion axis, the conduit having an inlet and an outlet for conveying radially inwardly flowing air;
  b. a fuel injector for injecting fuel into the radially inwardly flowing air in such a manner that the air and fuel mix to form a air-fuel mixture having a flow speed which is above the flame speed of the air-fuel mixture; and
  c. a bell-shaped throat having an inlet in fluid communication with the outlet of the conduit, the bell-shaped throat having an outlet, the bell-shaped throat further having a cross sectional area such that the cross sectional area of the throat remains constant from inlet to outlet.

13. A machine according to claim 12, further comprising:
  an air swirler disposed within the conduit for imparting a rotational component to the inwardly flowing air.

14. A machine according to claim 12, wherein the fuel is a gas.

15. A machine according to claim 12, wherein the fuel is propane.

16. An intake manifold for combining air and a fuel for forming an air-fuel mixture for injection into a burner having a combustion axis, the air-fuel mixture having an auto-ignition temperature and a flame speed under a specified set of conditions, the intake manifold comprising:
  a. a conduit having an inlet and an outlet for conveying air flowing radially inwardly with respect to the combustion axis, the flowing air having a flow speed;
  b. an air swirler disposed within a fairing disposed between the conduit and the burner for imparting a rotational component on the radially inwardly flowing air, the air swirler having an inlet diameter and an outlet diameter, the inlet diameter being greater than the outlet diameter such that the flow speed of the air is above the flame speed of the fuel;
  c. a fuel injector for injecting fuel into the radially inwardly flowing air in such a manner that the air and fuel mix for forming an air fuel-mixture; and
  d. a bell-shaped throat having an inlet in fluid communication with the outlet of the conduit, the bell-shaped throat further having an outlet, the bell-shaped throat having a cross sectional contour such that the cross sectional area remains constant from inlet to outlet.

17. A method for combusting in air a fuel having an auto-ignition temperature and a flame speed, the method comprising:
  a. propelling the air at a speed above the flame speed into an inlet of a throat, the throat also having an outlet and a constant cross sectional area from inlet to outlet; and
  b. mixing fuel into the air forming an air-fuel mixture, the air-fuel mixture exiting the outlet, such that a flame is created in the air-fuel mixture outside the outlet of the throat.

* * * * *

UNITED STATES PATENT AND TRADEMARK OFFICE
CERTIFICATE OF CORRECTION

PATENT NO. : 6,062,023
DATED       : May 16, 2000
INVENTOR(S) : John Kerwin, Kingston Owens, Michael Norris, Dean L. Kamen, Tim Duggan, C. Langenfeld It is certified that error appears in the above-identified patent and that said Letters Patent are hereby corrected as shown below:

Column 10, Line 51; change "annular" to --angular--
Column 10, Line 56; change "alone" to --along--

Signed and Sealed this

First Day of May, 2001

*Attest:*

NICHOLAS P. GODICI

*Attesting Officer*   *Acting Director of the United States Patent and Trademark Office*